Nov. 13, 1934. J. E. SMITH 1,980,735
APPARATUS FOR MAKING COFFEE INFUSIONS AND THE LIKE
Filed Sept. 28, 1929 2 Sheets-Sheet 1
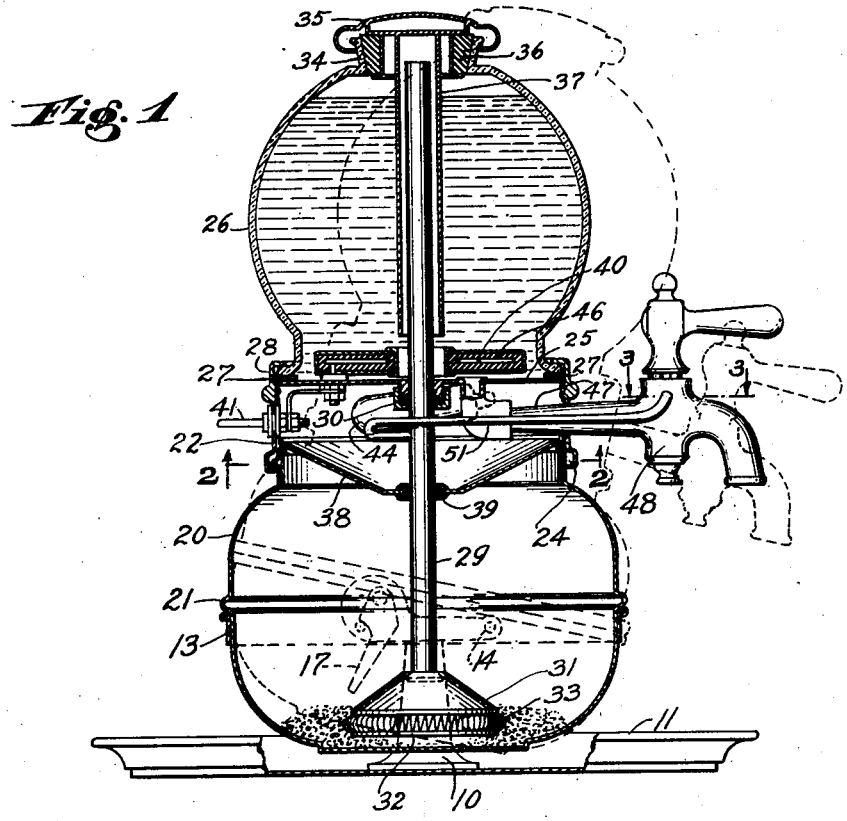
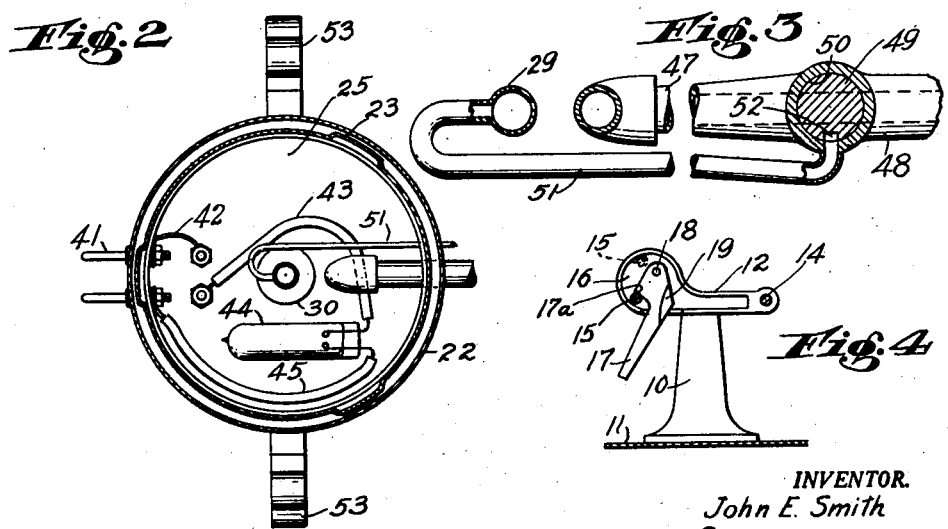
INVENTOR.
John E. Smith
BY
ATTORNEY.

Nov. 13, 1934.  J. E. SMITH  1,980,735
APPARATUS FOR MAKING COFFEE INFUSIONS AND THE LIKE
Filed Sept. 28, 1929  2 Sheets-Sheet 2
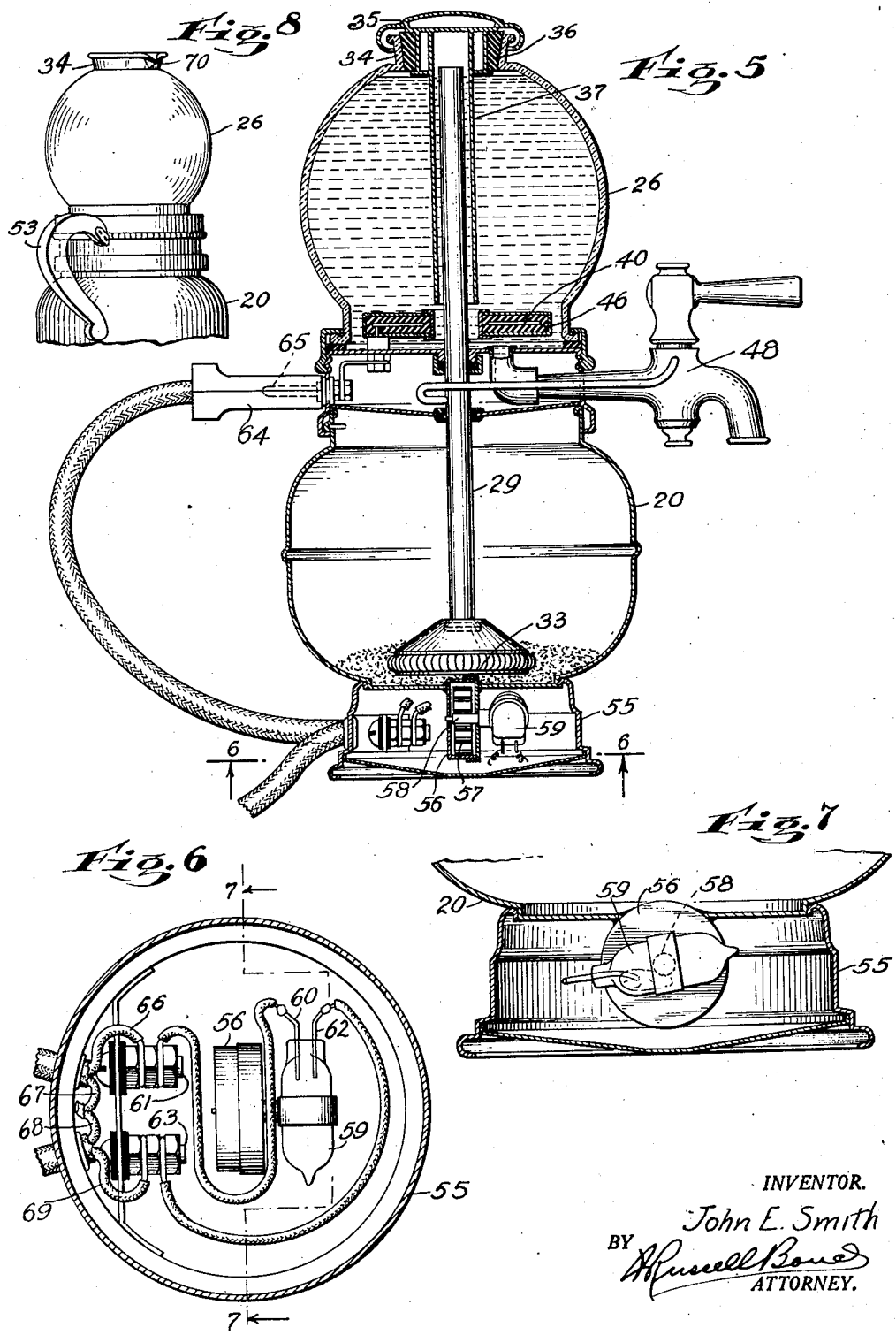
INVENTOR.
John E. Smith
BY
ATTORNEY.

Patented Nov. 13, 1934

1,980,735

UNITED STATES PATENT OFFICE 1,980,735

APPARATUS FOR MAKING COFFEE INFUSIONS AND THE LIKE

John E. Smith, Plainfield, N. J.

Application September 28, 1929, Serial No. 395,803

18 Claims. (Cl. 53—3)

My invention relates to improvements in apparatus for making infusions of coffee, tea, and the like, and has for an object to provide an infusing apparatus which will be automatic in its operation.

Recent scientific studies of coffee and coffee infusions have shown that in order to keep out undesirable oils from the infusion, it is essential that the water which contacts with the ground coffee be maintained below the boiling point and preferably above a temperature of 190 degrees Fahrenheit. Furthermore, the period of contact should be of short duration and the infusion should be removed from the grounds as soon as it has been prepared.

It is an object of the present invention to provide an apparatus which will carry out these ideal conditions of preparing coffee. But while my invention is particularly adapted for making coffee infusions it is not limited to such application but may be used for preparing other infusions as well.

More specifically, the object of the present invention is to provide an apparatus comprising a pair of receptacles connected by a siphon, in one of which receptacles water is placed and in the other ground coffee. Heat is applied to the first receptacle and when the water therein has been heated to the requisite temperature, sufficient pressure is developed to start the siphon which will cause transfer of the water to the second receptacle. This transfer results in a change in the center of gravity which is utilized to turn off the heat, and thereafter the first receptacle acts as a condenser, producing a partial vacuum which will cause a reverse flow through the siphon, drawing the coffee infusion back into the first receptacle.

Another object of the invention is to provide said siphon with filtering means to filter out the coffee grounds as the infusion is being withdrawn from said second receptacle.

Another object of the invention is to provide means for drawing off the infusion from said first receptacle and for simultaneously venting the said siphon so as to prevent the infusion from being siphoned off again into said second receptacle.

Another object of the invention is to provide an oscillatory support for the apparatus which on being tipped in one direction will turn on the heat, but will automatically tip back to normal position and turn off the heat as soon as the water has been siphoned out of the first receptacle.

Another object of the invention is to provide an electric heating unit for said first receptacle which unit contains heat retaining material adapted to retard to a predetermined extent the cooling of said first receptacle when the current has been turned off.

Another object of the invention is to provide a safety device for preventing the apparatus from tipping except when it is desired to cause the infusion operation to take place.

The present invention is a variant of that disclosed in my copending application Serial No. 293,362, filed July 17, 1928.

The above named and other objects of my invention will appear in the following description of a preferred embodiment of the present invention and thereafter the novelty and scope of the invention will be pointed out in the claims.

In the accompanying drawings, Figure 1 is a view largely in vertical section of my improved coffee infusing apparatus;

Fig. 2 is a view in transverse section taken on the line 2—2 of Fig. 1 and looking upward as indicated by the arrows;

Fig. 3 is an enlarged detail view partly in section, the section being taken on the line 3—3 of Fig. 1; and Fig. 4 is a detail view of the safety latch mechanism.

Fig. 5 is a view in vertical section of a modified form of my invention;

Fig. 6 is a view in transverse section taken on the line 6—6 of Fig. 5 and looking upward, as indicated by the arrows;

Fig. 7 is a view in vertical section of the base of the apparatus, the section being taken on the line 7—7 of Fig. 6; and Fig. 8 is a fragmentary view in perspective of still another form of my invention.

My coffee infusing apparatus is adapted to be supported on a stand comprising a pair of standards 10 rising from and secured to a tray 11. Each of the standards 10 is formed at its upper end with a cross head 12. A supporting ring 13 is provided with trunnion pins 14 which are pivoted in the cross heads near their forward ends. Thus, the pins 14 are parallel to but spaced somewhat in advance of a diametric axis of the ring while to the rear of said axis is a pair of opposed pins 15, each of which projects into a recess 16 formed in the inner face of the adjacent cross head 12. The recess is of such shape that normally the pin 15 will rest at the bottom thereof, as indicated in Fig. 4, thus supporting the ring 13 in horizontal position. However, the ring may be tilted about the pins 14 as an axis and the pins 15 will then swing up against the top of the recesses 16, as indicated by broken lines in Fig. 4. One of the standards is provided with a latch 17 for holding the pin 15 in the lower position. This latch is pivoted to the cross head at a point 18 and has a shoulder 17a adapted to fit over the pin 15 when the latter is in lowermost position. The latch is provided with a weight 19 at one side thereof which tends normally to swing the latch to latching position. A portion of the latch projects below the cross-head 12 as shown and serves as a finger piece to permit of moving the latch free of the pin 15 when it is desired to tilt the ring 13.

The ring 13 provides a support in which a vessel 20 may be seated. The latter has an annular rib 21 extending horizontally thereabout substantially midway of its height, and this rib is adapted to rest on the upper edge of the ring 13. The vessel 20 is provided at its upper end with a widemouthed neck which is normally open, but which in service is closed by means of a cap 22. The neck of the vessel 20 is formed with outwardly projecting lugs 23 adapted to enter laterally off-set recesses 24 in the side wall of the cap so that by turning the vessel relatively to the cap, the parts will be locked together after the manner of a bayonet joint. The top wall 25 of the cap 22 serves as a diaphragm separating the lower vessel 20 from an upper vessel 26. The latter is preferably formed of glass so that the operation of the apparatus may be observed. The vessel 26 terminates at its lower end in a wide mouthed rim which is closed by the diaphragm 25. A gasket 27 is inserted between the plate 25 and the rim so as to provide a water-tight joint, and the rim is clamped in place by a flange ring 28 which laps over the outwardly turned rim and is screwed upon a threaded portion of the cap 22.

A vertical pipe 29 leads through the diaphragm 25 and provides communication between the two vessels 20 and 26. A suitable packing 30 forms a water-tight joint at the point where the pipe 29 passes through the diaphragm 25. The pipe 29 is formed at its lower end with a flaring portion or inverted funnel 31 which terminates close to the bottom wall of the vessel 20. Over the mouth of this funnel is placed a filter 32 of cloth or other suitable material and the latter is secured to the funnel by a spring band 33 which fits over the filter material and is seated in a suitable annular recess formed in the outer wall of the funnel.

The upper end of the vessel 26 has a neck portion 34 adapted to be closed by a stopper 35. The stopper is formed with a rubber gasket 36 which closely fits the neck 34 and provides an air-tight seal. Depending from the stopper 35 is a pipe 37 which telescopes over the pipe 29 and extends to a point near the bottom of the vessel 26. The pipe 29 projects into the pipe 37 to a point within the stopper 35, but the two pipes are annularly spaced apart and together they constitute a siphon.

The upper end of the vessel 20 is also provided with baffle in the form of a dished disk or conical plate 38 which is mounted on the pipe 29 and is connected thereto by a rubber collar 39. The disk 38 rests at its periphery on the rim of the vessel 20 and between the disk 38 and the top wall 25 of the cap 22 is formed a chamber in which is located certain valve mechanism, as will be explained hereinafter.

Within the vessel 26 and suitably supported on the diaphragm 25 is an electric resistance unit 40, one terminal of which is connected to one of a pair of plug pins 41, by means of a wire 42. The other terminal of the resistance unit is connected by a wire 43 to one contact point of a gravity switch, the other contact point of which is connected by a wire 45 to the other plug pin 41. The gravity switch may be of any suitable type, but is here shown as consisting of a bulb containing a certain quantity of mercury, the bulb being so tipped that normally the contact points therein do not contact with the mercury, but when the apparatus is tilted to the position shown by broken lines in Fig. 1, the contact points will be submerged in the mercury, thereby closing a circuit through the resistance unit 40.

The resistance unit 40 is preferably embedded in a mass of clay 46 or other suitable material which will retain heat and the clay is then suitably incased in a material which will not be affected by the coffee infusion.

An outlet pipe 47 is connected through the wall 25 with the chamber 26 and extends through the side wall of the cap 22. This outlet pipe is provided at its outer end with a cock 48 through which the contents of the vessel 26 may be drawn off. This cock is preferably of the type having a transversely apertured plug 49 rotatable in a valve seat 50. Leading from the pipe 29 is a vent pipe 51 which at its outer end opens into the valve seat 50 as shown in Fig. 3. The plug 49 is provided with a slot 52 with which the vent pipe communicates when the cock is opened. The slot 52 extends above the valve casing 49 and thus provides an air vent for the pipe 29. This vent, however, is normally closed and is opened only when the plug 49 is turned to such position as to draw off coffee from the vessel 26. Handles 53 are attached to the cap 25 to permit of lifting the apparatus off the stand whenever desired.

In use, the vessel 20 is disconnected from the cap 22 and a certain quantity of ground coffee is introduced into the vessel after which the parts are again connected. The stopper 35 is now removed and a certain quantity of water is introduced into the vessel 26. The stopper is then replaced and the apparatus is mounted on the stand with the vessel seated in the ring 13. It will be observed that the center of gravity of the two vessels is well above the pivots 14 by reason of the weight of water in the vessel 26. The latch 17 is now tripped and the vessels are tipped over to the position shown in Fig. 1 which position they will maintain because the center of gravity in the apparatus will lie forward of a vertical plane passing through the pivots 14. As soon as the apparatus is thus tilted the gravity switch 44 will close and electrical energy will then be supplied to the heating unit 40. As the water in the vessel 26 is heated the expansion of air in the water and the vapor generated will cause the water in pipe 37 to rise above the top of the pipe 29 and start an outflow therethrough. The water will then be siphoned off into the chamber 20 and will come into contact with the ground coffee therein. As the water flows out of the vessel 26 into the vessel 20, there will be a displacement of the center of gravity to the opposite side of said vertical plane and the apparatus will automatically swing back to the full line position shown in Fig. 1. In this position it will be immediately latched by the engagement of shoulder 17a of weighted latch 17 with the adjacent pin 15.

When the apparatus returns to vertical position the current will be cut off by the gravity switch 44 and the heating unit 40 will cool down.

The time which it takes to cool down will depend, however, on the mass of material 46 in which it is embedded and this time is predetermined so as to keep the water in the chamber 20 in contact with the coffee therein for a requisite interval. As the heating unit cools down and heat is radiated from the walls of the vessel 26 the vapor therein will be condensed and a partial vacuum will be formed in said vessel, which will cause the coffee infusion in vessel 20 to be drawn up through the pipe 29 and discharged into the vessel 26 through the pipe 37. As the infusion is drawn up the pipe 29 it must pass through the filter 32 thereby filtering out the coffee grounds. One can determine when the coffee is ready by noting when the level of coffee infusion ceases to rise in the vessel 26. If one desires a stronger infusion, the apparatus may be tipped again so as to repeat the cycle of operations described above. This cycle may be repeated as many times as desired. However, it is preferable to arrange the parts so as to give the desired infusion at a single operation of the apparatus.

When the coffee infusion is completed, the coffee may be drawn off through the pipe 47 by operating the cock 48. As the coffee is drawn out of pipe 47 it is necessary that the air seal of the pipe 29 be broken, otherwise air might enter the receptacle 26 through the pipe 47 and start a flow of the siphon which would empty out the contents of the receptacle 26 into the receptacle 20. It is for this reason that the air vent pipe 51 is provided, leading from the pipe 29 to the cock 48, so that as soon as the cock is opened air will enter the pipe 29 and permit the liquid held in suspension therein by the difference in atmospheric pressure between the chamber 20 and chamber 26, to flow out into the chamber 20. At the same time air entering chamber 26 by way of pipe 51 and 29 will displace the coffee drawn out and insure a smooth discharge through the cock 48. It will be understood, of course, that although the vessel 20 is closed at its upper end, the closure is not air tight and sufficient air may pass into or out of the vessel to maintain the pressure therein substantially equal to the outside atmospheric pressure. The upper vessel 26, however, must be maintained air-tight during the infusing operation so as to develop a sufficient pressure during the heating period to start the siphon running, and thereafter to maintain sufficient reduction of pressure during the condensing period to siphon the liquid from the chamber 20 back into the chamber 26.

The water in vessel 26 starts to siphon off before it reaches the boiling point and at first the outflow is rather slow because it is checked by the partial vacuum produced in the vessel 26. However, the outflow accelerates and becomes fairly rapid after about one-third of the water has been siphoned off. The apparatus swings up to vertical position before the water has been entirely siphoned out of the upper vessel and although the current is cut off, the residual heat in the mass of clay surrounding the heating element is sufficient to boil off the water remaining in the vessel 26. The boiling water is mixed in the vessel 20 with the cooler water which preceded it, so that the temperature of the water in contact with the ground coffee is several degrees below the boiling point. The final discharge from the vessel 26 is in the form of steam bubbles which violently agitate the infusion in the vessel 20, causing a thorough mixture and intimate contact of the ground coffee with the water. By varying the mass of clay 46 in the heating element, the temperature of the liquid in the vessel 20 may be controlled. However, the apparatus is preferably so designed that the ground coffee is not subjected to a boiling temperature. The period of contact of the water with the ground coffee is limited and depends upon the mass of heat retaining material in the heating unit. At the end of this period, the coffee infusion is immediately withdrawn from contact with the coffee grounds. Thus, the ideal conditions for preparing coffee are carried out by my coffee infusing apparatus.

The latch 17 serves to hold the apparatus steady when the cock 48 is operated to draw off the coffee, and it also serves as a safety device to prevent accidental tipping of the apparatus, and overheating of the resistance unit when the vessel 26 is empty.

The modified form of my invention shown in Figs. 5 to 7 inclusive, differs mainly in the fact that the vessels 20 and 26 do not tip and a thermostat is employed to tilt the gravity switch and cut off the current after the requisite amount of heat has been applied. In the drawings of this modification, I use the same reference numerals as in the previously described embodiment to designate corresponding parts.

It will be observed that the lower vessel 20, instead of being supported in an oscillating frame, is secured to a fixed base 55. In this base is supported a thermostat, the casing 56 of which projects through the bottom wall of the vessel 20. This thermostat preferably comprises a coil of bi-metallic ribbon 57, secured at its outer end to the casing and at its inner end to a shaft 58. The latter projects from one side of the casing and carries the bulb of a mercury switch 59. One terminal 60 of this switch is connected to a binding post 61 while the other terminal 62 is connected to a binding post 63. A socket plug 64 is detachably connected to a pair of plug pins 65 which form the opposite terminals of the resistance unit 40. One of these terminals is connected through the plug by a flexible lead 66 to the binding post 61, while the other plug is connected by a flexible lead 67 to a line wire 68. The companion line wire 69 is connected to the binding post 63. Thus, current from one line wire to the other is led through the heating unit under control of the mercury switch 59. As in the previously described apparatus the heating unit 40 is embedded in a mass of heat retaining material such as clay 46.

The operation of this apparatus is similar to that previously described except for the fact that the vessels do not tip. Ground coffee is placed in the vessel 20 and the vessel 26 is filled with water. The switch 59 is in closed position when the thermostat 56 is cold. Current is led to the heating unit 40 by applying the socket plug 64 to the pins 65. When the water is heated, sufficient pressure is developed to start an outflow through the siphon. This outflow takes place long before the boiling point is reached. The thermostat is set to operate at a comparatively low temperature, say 165 to 180 degrees Fahrenheit. This temperature is not reached until more than one-third of the contents of the vessel 26 have been discharged into the vessel 20. As soon as the thermostat has been sufficiently heated, it rocks the bulb of the mercury switch 59 and cuts off the current to the heating unit. However, sufficient heat is stored in the heat retaining mass 46 to continue vaporizing the water in the vessel 26 and finally to cause bubbles of steam to pass down through the siphon and agitate the infusion in vessel 20. After the vapor in the vessel 26 has cooled off and condensed, the coffee extract will siphon back into the vessel 26, and the coffee grounds, being strained out by the filter 33, will remain in the vessel 20.

In place of using a faucet to draw off the coffee it may be poured out of the top of the vessel 26. Thus, in the form of apparatus shown in Fig. 8, the neck 34 of the vessel 26 is formed with a pouring spout 70. After the coffee has been made the stopper 35, together with the siphon leg 37, is removed, and the coffee infusion may then be poured out of the spout 70. This offers the advantage of a cheaper construction and obviates the necessity of providing means for breaking the liquid column in the leg 29 of the siphon.

While I have described certain embodiments of my invention, it will be understood that they are to be considered as illustrative and not limitative of the invention and that I reserve the right to make such changes in details of construction and form and arrangements of parts as fall within the spirit and scope of the claims.

For convenience, I use in the claims the term "infuser" to designate a receptacle which performs the functions of vessel 26 and the term "boiler" to designate a receptacle which performs the functions of vessel 20, but with the understanding that the water may or may not be heated to the boiling point in said "boiler".

I claim:

1. In an apparatus of the character described, a pair of rigidly connected vessels, a stand on which the vessels are mounted to oscillate, a siphon providing communication between said vessels, means for supplying heat to one of the vessels, and means controlled by the position of the vessels for turning said heat on and off.

2. In an apparatus of the character described, a pair of rigidly connected vessels, a stand on which the vessels are mounted to oscillate about a substantially horizontal axis, a siphon providing communication between said vessels, one of said vessels being normally sealed, means for supplying heat to the sealed vessel, and means controlled by the position of the vessels for turning said heat on and off.

3. In a device of the character described, a pair of rigidly connected vessels, a stand on which the vessels are mounted to oscillate to and from a normal position, a siphon providing communication between the vessels, one of the vessels being normally sealed, means for supplying heat to the sealed vessel, a control device adapted to turn on the heat when the vessels are moved away from normal position and to cut off the heat when the vessels are returned to normal position.

4. In a device of the character described, a pair of rigidly connected vessels, a stand on which the vessels are mounted to oscillate to and from a normal position, a siphon providing communication between the vessels, one of the vessels being normally sealed, means for supplying heat to the sealed vessel, a control device adapted to turn on the heat when the vessels are moved away from normal position and to cut off the heat when the vessels are returned to normal position, and a latch for holding the vessels in the latter position.

5. In a device of the character described, a pair of rigidly connected vessels, a stand on which the vessels are mounted to oscillate to and from a normal position, a siphon providing communication between the vessels, one of the vessels being normally sealed, means for supplying heat to the sealed vessel, a control device adapted to turn on the heat when the vessels are moved away from normal position and to cut off the heat when the vessels are returned to normal position, stop means for limiting the angle of oscillation of the vessels, and a latch adapted to hold the vessels in normal position.

6. In an apparatus of the character described, a pair of vessels disposed one above the other, a mounting therefor permitting the vessels to be tipped out of vertical position, a siphon providing communication between the vessels, one of the vessels being normally sealed, and means operating only when said vessels are tipped to supply heat to the sealed vessel.

7. In an apparatus of the character described, a pair of vessels disposed one above the other, a mounting therefor permitting the vessels to be tipped out of vertical position, a siphon providing communication between the vessels, one of the vessels being normally sealed, means operating only when said vessels are tipped to supply heat to the sealed vessel, and safety means for preventing accidental tipping of the vessels.

8. In an apparatus of the character described, a pair of vessels disposed one above the other, a mounting therefor permitting the vessels to be tipped out of vertical position, a siphon providing communication between the vessels, one of the vessels being normally sealed, means for supplying heat to the sealed vessel to cause transfer of liquid therefrom to the other vessel, and a gravity actuated control device for turning on the heat when the vessels are tipped and cutting off the heat when the vessels are returned to vertical position.

9. In an apparatus of the character described, a pair of vessels disposed one above the other, a mounting therefor permitting the vessels to be tipped out of vertical position, a siphon providing communication between the vessels, one of the vessels being normally sealed, means for supplying heat to the sealed vessel to cause transfer of liquid therefrom to the other vessel, and a gravity actuated control device for turning on the heat when the vessels are tipped and cutting off the heat when the vessels are returned to vertical position, and a catch for holding the vessels in the latter position.

10. In a device of the character described, a stand including a support adapted to tip about a substantially horizontal axis, an infuser mounted on the support, a boiler mounted on the infuser, a siphon providing communication between the boiler and the infuser, a heating unit for the boiler, a gravity controlled means movable with the boiler for turning the heat on when the boiler is tipped, thereby causing transfer of liquid from the boiler to the infuser, said axis being so positioned that the boiler and infuser will return to upright position when the liquid is transferred to the infuser, thereby turning off the heat.

11. In a device of the character described, a pair of vessels disposed one above the other, the upper vessel being normally sealed and constituting a boiler, the lower vessel constituting an infuser, a mounting for the vessels permitting the same to tip about a substantially horizontal axis, a siphon providing communication between the vessels, an electric heating unit for the boiler, and a normally open gravity switch carried by the vessels and adapted to close the circuit of said unit when the vessels are tipped, whereby liquid in the boiler will be siphoned into the infuser, the position of said axis being such that the shifting of the center of gravity caused by transfer of the liquid to the infuser will restore the vessels to upright position and open said switch.

12. In a device of the character described, a pair of vessels disposed one above the other, the upper vessel being normally sealed and constituting a boiler, the lower vessel constituting an infuser, a mounting for the vessels permitting the same to tip about a substantially horizontal axis, a siphon providing communication between the vessels, an electric heating unit in the boiler, and a normally open gravity switch carried by the vessels and adapted to close the circuit of said unit when the vessels are tipped, whereby liquid in the boiler will be siphoned into the infuser, the position of said axis being such that the shifting of the center of gravity caused by transfer of the water to the infuser will restore the vessels to upright position and open said switch, said heating unit containing heat retaining material adapted to retard cooling of the boiler to a predetermined extent.

13. In a device of the character described, a pair of vessels disposed one above the other, the upper vessel being normally sealed and constituting a boiler, the lower vessel constituting an infuser, a mounting for the vessels permitting the same to tip about a substantially horizontal axis, a siphon providing communication between the vessels, an electric heating unit for the boiler, a normally open gravity switch carried by the vessels and adapted to close the circuit of said unit when the vessels are tipped, whereby liquid in the boiler will be siphoned into the infuser, the position of said axis being such that the vessels will return to upright position and open the switch when the liquid is transferred to the infuser, and a latch for holding the vessels in upright position.

14. In a device of the character described, a pair of vessels disposed one above the other, the upper vessel being normally sealed and constituting a boiler, the lower vessel constituting an infuser, a mounting for the vessels permitting the same to tip about a substantially horizontal axis, a siphon providing communication between the vessels, the legs of the siphon being concentrically disposed, an electric heating unit for the boiler, a normally open gravity switch carried by the vessels and adapted to close the circuit of said unit when the vessels are tipped, whereby liquid in the boiler will be siphoned into the infuser, the position of said axis being such that the vessels will return to upright position and open the switch when the liquid is transferred to the infuser.

15. In a device of the character described, a pair of vessels, one of the vessels being normally sealed and constituting a boiler and the other vessel constituting an infuser, a mounting for the vessels permitting the same to tip about a substantially horizontal axis, a siphon providing communication between the vessels, a filter associated with the siphon, an electric heating unit for the boiler, a normally open gravity switch carried by the vessels and adapted to close the circuit of said unit when the vessels are tipped, whereby liquid in the boiler will be siphoned into the infuser, the position of said axis being such that the vessels will return to upright position and open the switch when the liquid is transferred.

16. In a device of the character described, a pair of vessels, one of which is normally sealed and constitutes a boiler while the other constitutes an infuser, a mounting for the vessels permitting the same to tip about a substantially horizontal axis, a siphon providing communication between the vessels, the siphon in the infuser terminating in a flaring mouth in the infuser, filter material removably secured over said mouth, an electric heating unit for the boiler, a normally open gravity switch carried by the vessels and adapted to close the circuit of said unit when the vessels are tipped, whereby liquid in the boiler will be siphoned into the infuser, the position of said axis being such that the vessels will return to upright position and open said switch when the liquid is transferred to the infuser.

17. In a device of the character described, a boiler, an infuser, a siphon connecting the boiler and the infuser, heat controlled means for transferring liquid from the boiler through the siphon into the infuser and vice versa, a stop-cock for drawing off the contents of the boiler, and an air vent controlled by opening of the cock for venting said siphon.

18. In a device of the character described comprising, a boiler, an infuser, a siphon connecting the boiler and the infuser, heat controlled means for transferring liquid from the boiler through the siphon into the infuser and vice versa, a stop-cock for drawing off the contents of the boiler, and means for admitting air into the boiler through the siphon when the cock is opened.

JOHN E. SMITH.